No. 859,245. PATENTED JULY 9, 1907.
J. A. PERKINS.
ROLLER BEARING.
APPLICATION FILED SEPT. 12, 1903.
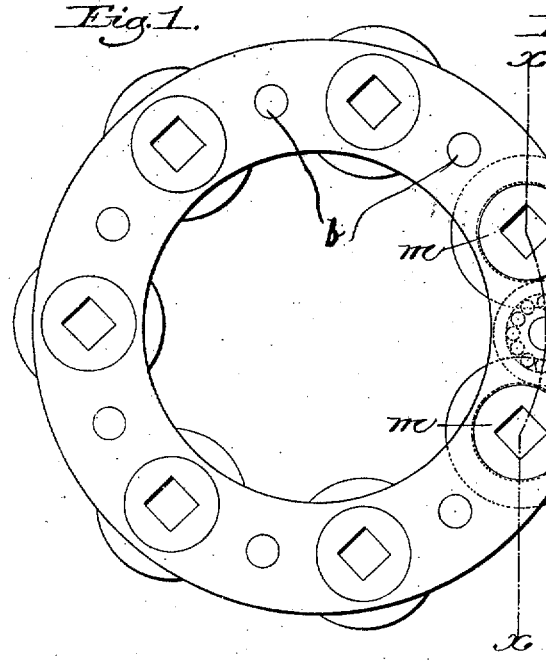
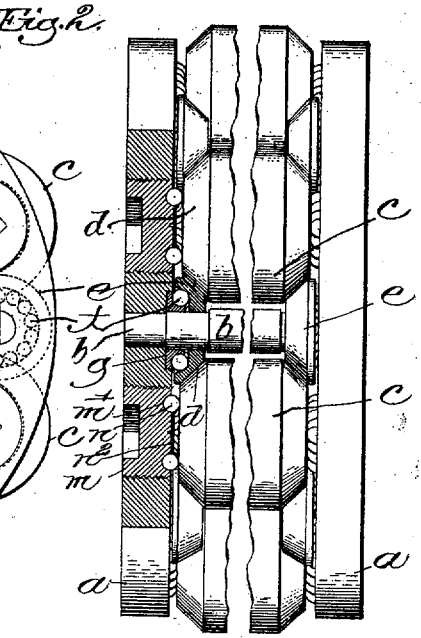
Fig. 1. Fig. 2.
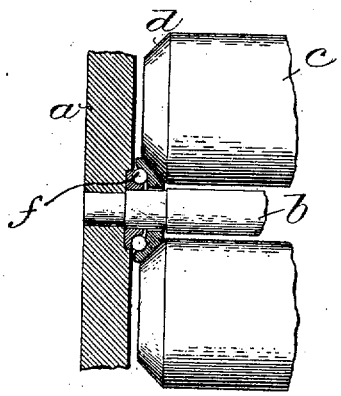
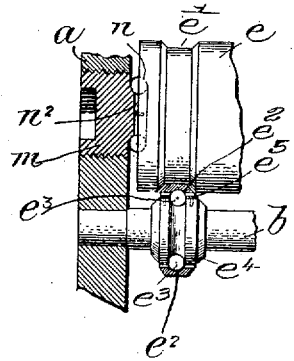
Fig. 3. Fig. 4.
Witnesses:
Fred S. Greenhof
S. Wm. Lutton
Inventor,
Julius A. Perkins,
by Mosby Gregory
Attys.

UNITED STATES PATENT OFFICE.

JULIUS A. PERKINS, OF OMAHA, NEBRASKA, ASSIGNOR, BY MESNE ASSIGNMENTS, TO UNITED STATES ROLLER BEARING COMPANY, OF JERSEY CITY, NEW JERSEY, A CORPORATION OF NEW JERSEY.

ROLLER-BEARING.

No. 859,245.

Specification of Letters Patent.

Patented July 9, 1907.

Application filed September 12, 1903. Serial No. 172,876.

*To all whom it may concern:*

Be it known that I, JULIUS A. PERKINS, a citizen of the United States, residing at Omaha, in the county of Douglas and State of Nebraska, have invented an Improvement in Roller-Bearings, of which the following description, in connection with the accompanying drawings, is a specification, like letters on the drawings representing like parts.

This invention relating to roller bearings has for its object the production of a roller bearing wherein the bearing rollers instead of being sustained by balls supported by spindles or studs concentric with the longitudinal centers of said rollers are alined through the ribs connecting the cage ends, said ribs being provided preferably with ball tracks having balls that in turn sustain turn-tables with which the exterior of the rollers contact. The end thrust of the rollers is resisted by end-thrust devices located within the cage ends opposite the ends of the rollers.

Figure 1, in side elevation, represents a cage containing bearing rollers sustained in accordance with my present invention; Fig. 2 is an edge and partial sectional view in the line $x$, Fig. 1, of the cage and bearing-rollers, the bearing-rollers and ribs for rigidly connecting the ends of the cage being broken out centrally to shorten the same; Fig. 3 is an enlarged detail showing a slightly different shaped turn-table and track surrounding a rib; and Fig. 4 shows yet a further modification.

The cage shown is composed of end rings $a$, united rigidly by ribs $b$, the ribs in this instance of my invention being represented as circular throughout. The cage receives a series of bearing-rollers $c$, of a diameter in excess of the width of the rings, as shown in Fig. 1, so that the surfaces of the rollers outside the rings may contact and roll over the interior of any usual box while the surfaces of the rollers inside the rings roll over a journal. The bearing rollers are solid or unbored, and each roller has an inclined portion $d$, which co-acts with and is sustained by a turn-table $e$, surrounding loosely one of the ribs, as represented. The turn-tables are represented as cupped to embrace a series of balls $f$, sustained by ball tracks $g$, surrounding the ribs $b$. Each rib $b$ is provided with a plurality of turn-tables and each roller in practice contacts with a plurality of turn-tables surrounding parallel ribs. The turn-tables sustained by the balls run without friction against the ribs, as do also the bearing rollers. The ball sustained turn-tables act to guide, separate and aline the bearing-rollers as they rotate about their longitudinal axes with the cage as the latter travels about the journal in the usual box.

The end-thrust of the bearing-rollers is resisted by end-thrust devices carried by the cage ends, one form of such device being shown as a plug $m$, having at its inner end a raceway $m'$, in which may be placed suitable anti-friction means, which may be balls $n$ maintained in working position by any suitable bail-retainer, as shown at $n^2$, or equivalent anti-friction means.

This invention is not limited to the particular degree of inclination of the surfaces of the bearing-rollers that contact with the turn-tables; nor to the location of said inclinations on the bearing-roller at the exact position shown in the drawings; nor to the particular shape shown for the turn-tables and ball-tracks, although the forms shown are among the best now known to me.

In the modification, Fig. 4, the solid roller $e$ has an annular groove $e'$ in which enters a turn-table $e^2$ made as a ring sustained on balls $e^3$ maintained in working position on an enlarged part $e^4$ of the rib by a ball retainer $e^5$, which may be of any usual construction. The turn-table $e^2$, Fig. 4, is shown as presenting beveled edges $e^4$ that contact with the beveled edges of the bearing rollers. In this modification of Fig. 4 it will be understood that the bails $n$ will be sustained as provided for and shown in Fig. 2. The roller $e$ bears at its end against balls $n$ which travel in a raceway $m'$ formed in the end of a plug $m$ which is screw-threaded into the member $a$. In assembling the parts the plug $m$ is screwed into place after the roller $e$ has been positioned with the turn-table received in the groove $e'$.

Heretofore balls have been inserted in chambers at the ends of and to sustain bearing-rollers, the balls rolling over spindles extended through a central hole in the roller, or over studs located in line with the longitudinal axes of said rollers. By sustaining the bearing rollers as herein shown the expense of boring the same and of forming chambers therein, and the cost of the spindles or studs is avoided, and the ribs besides connecting the cage ends rigidly together are made to guide anti-frictionally and aline the bearing rollers.

Having described my invention, what I claim as new and desire to secure by Letters Patent, is:—

1. In a roller bearing, a cage composed of rings and ribs connecting the same, a series of ball-supported turn-tables, and a series of bearing rollers separated and alined externally by said turn-tables.

2. In a roller bearing, a cage composed of rings and ribs connecting the same rigidly, a series of ball-supported turn-tables, and a series of bearing rollers having portions thereof reduced in diameter and separated and alined by said turn-tables.

3. In a roller bearing, a cage composed of rings and ribs connecting the same rigidly, a series of externally beveled ball-sustained turn-tables, and a series of bearing rollers having bevels to co-act with the bevels of the turn-table and afford anti-friction guiding means for said rollers.

4. In a roller bearing, a cage composed of rings and ribs connecting the same rigidly, a series of externally beveled ball-sustained turn-tables, and a series of bearing rollers having bevels to co-act with the bevels of the turn-table and afford anti-friction guiding means for said rollers, and anti-friction means interposed between the roller ends and cage ends.

5. In a roller bearing, a cage composed of rings and ribs connecting the same rigidly, tracks located inside said rings and surrounding said ribs, turn-tables surrounding said ribs, a series of balls interposed between said turn-tables and tracks, and a series of bearing rollers alined wholly by said turn-tables.

6. In a roller bearing, a cage comprising end rings and ribs connecting the same rigidly, combined with a series of bearing rollers and anti-frictionally sustained turn-tables movable about said rib and separating said bearing rollers.

7. In a roller bearing, a cage comprising end rings and ribs connecting the same rigidly, combined with a series of bearing rollers and anti-frictionally sustained turn-tables movable about said rib and separating said bearing rollers, and end-thrust means in said cage with which the ends of bearing rollers may contact.

8. In a roller bearing, a cage comprising end rings and ribs connecting the same rigidly, combined with a series of bearing rollers and anti-frictionally sustained turn-tables movable about said rib and alining said bearing roller, and end-thrust means adjustable in said cage and with which the ends of the bearing rollers may contact.

In testimony whereof, I have signed my name to this specification, in the presence of two subscribing witnesses.

JULIUS A. PERKINS.

Witnesses:
M. R. KAVANAGH,
SIMEON H. CRANE.